March 28, 1967   F. B. BRANDRETH ETAL   3,310,926
PANEL CONSTRUCTION
Filed April 8, 1964   5 Sheets-Sheet 1
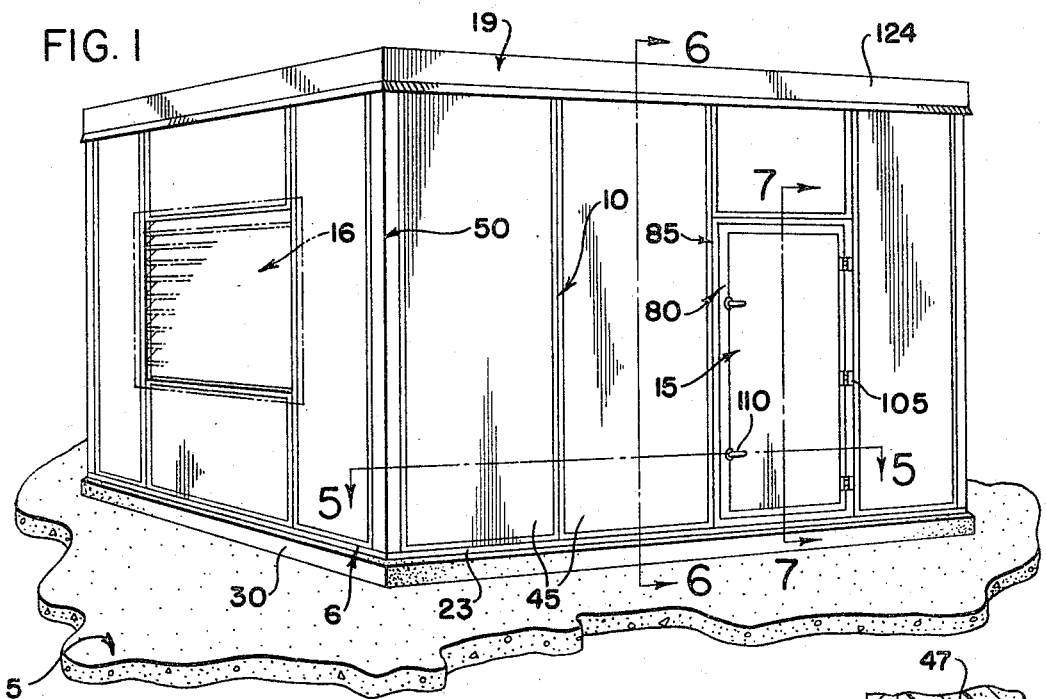
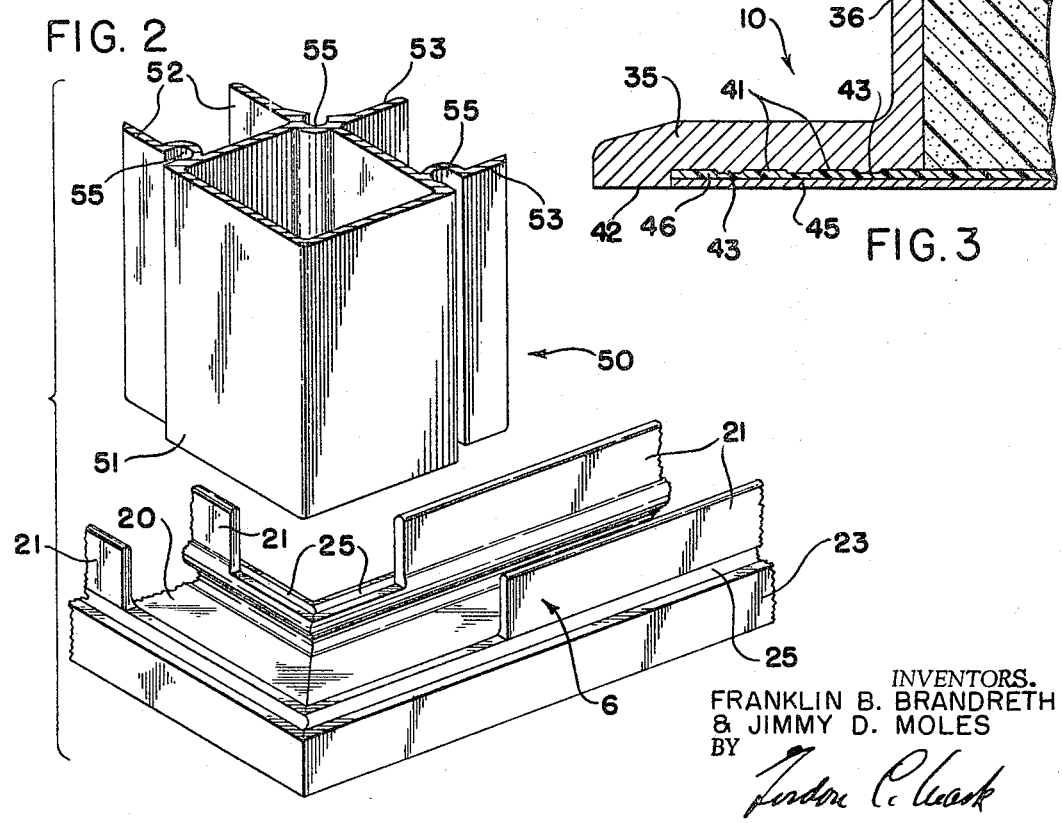
INVENTORS.
FRANKLIN B. BRANDRETH
& JIMMY D. MOLES
BY
ATTORNEY

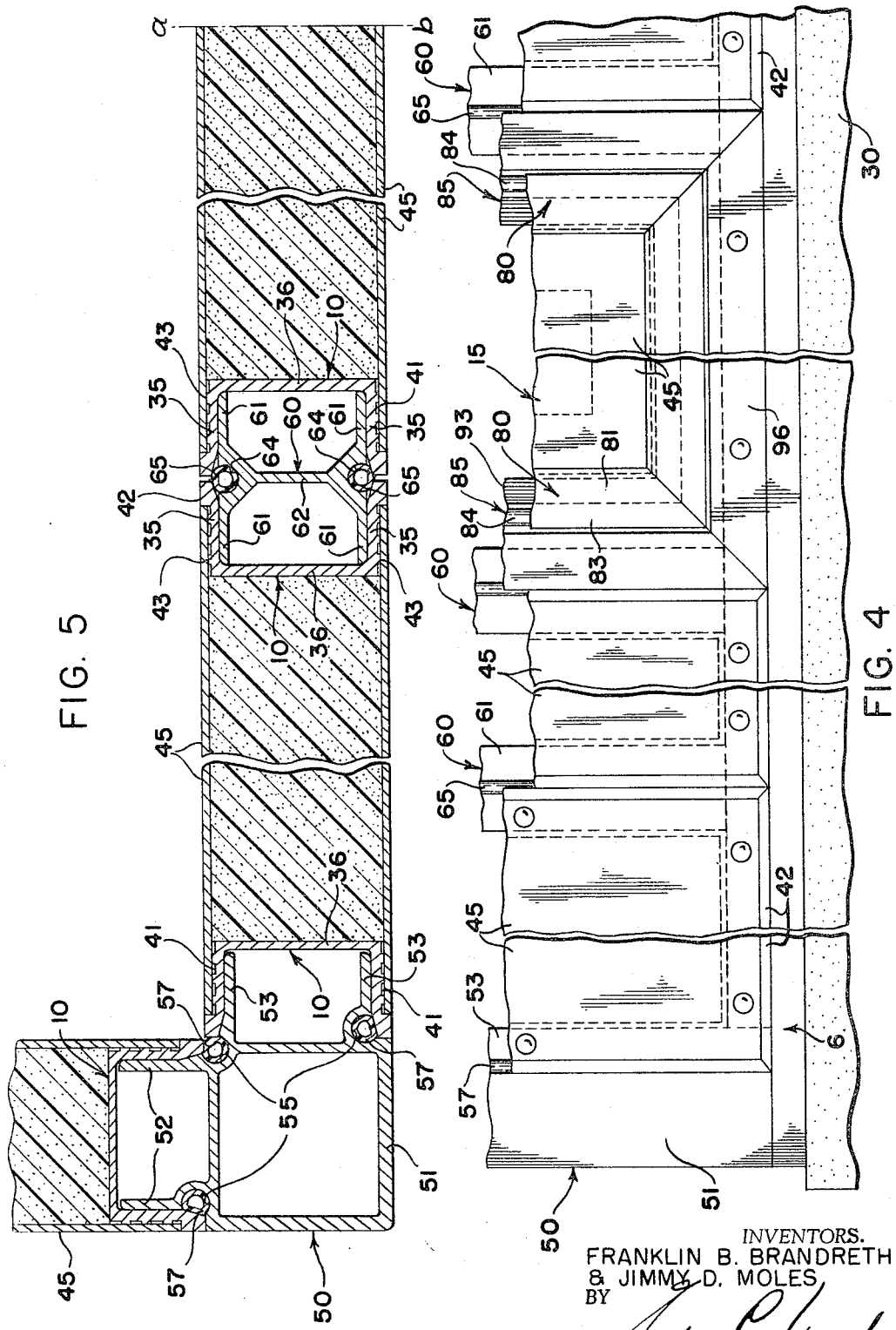

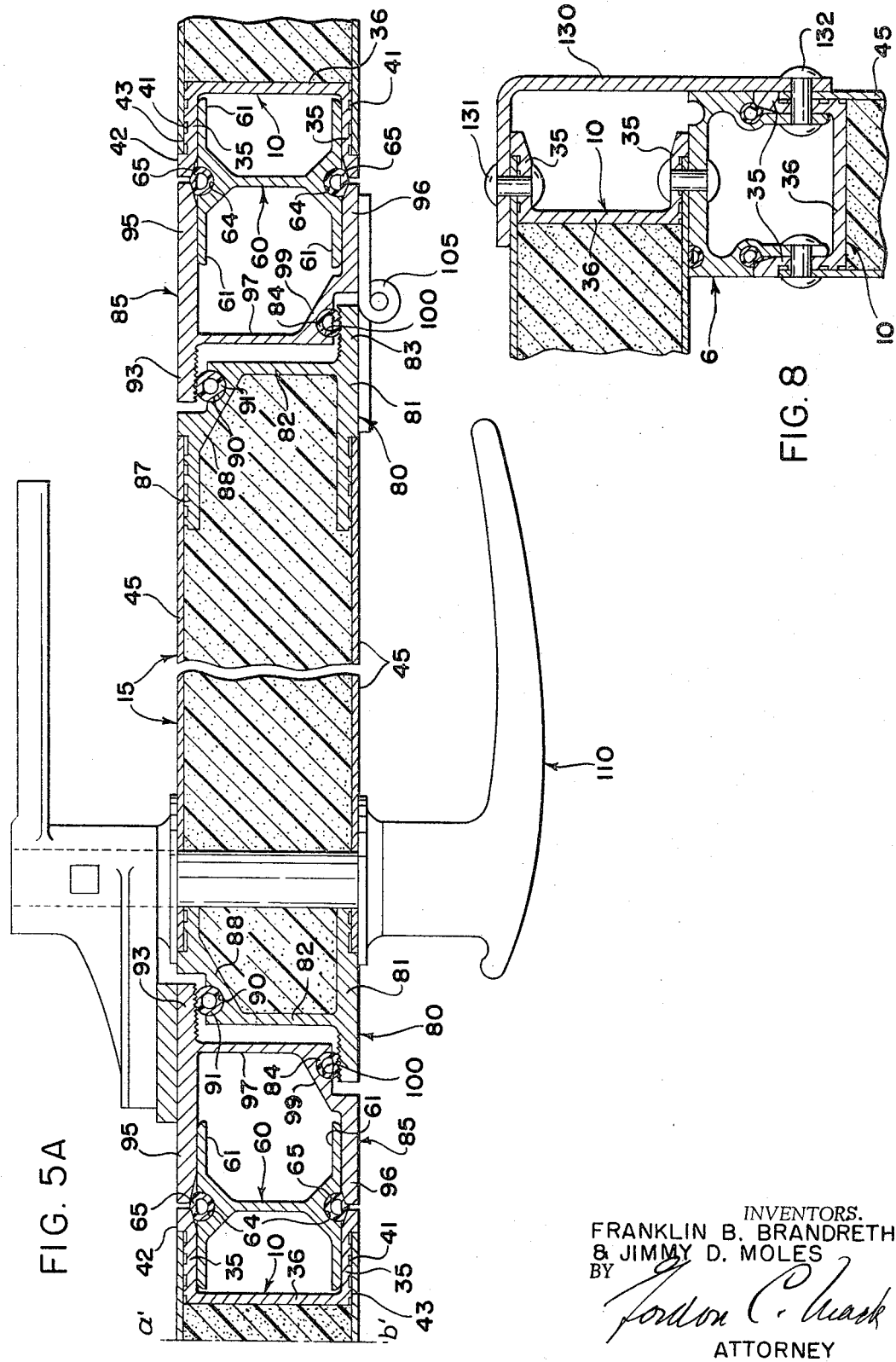

March 28, 1967 F. B. BRANDRETH ETAL 3,310,926
PANEL CONSTRUCTION
Filed April 8, 1964 5 Sheets-Sheet 4
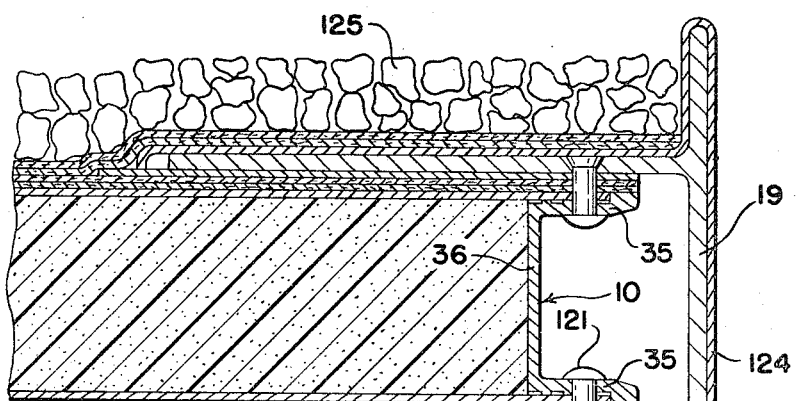
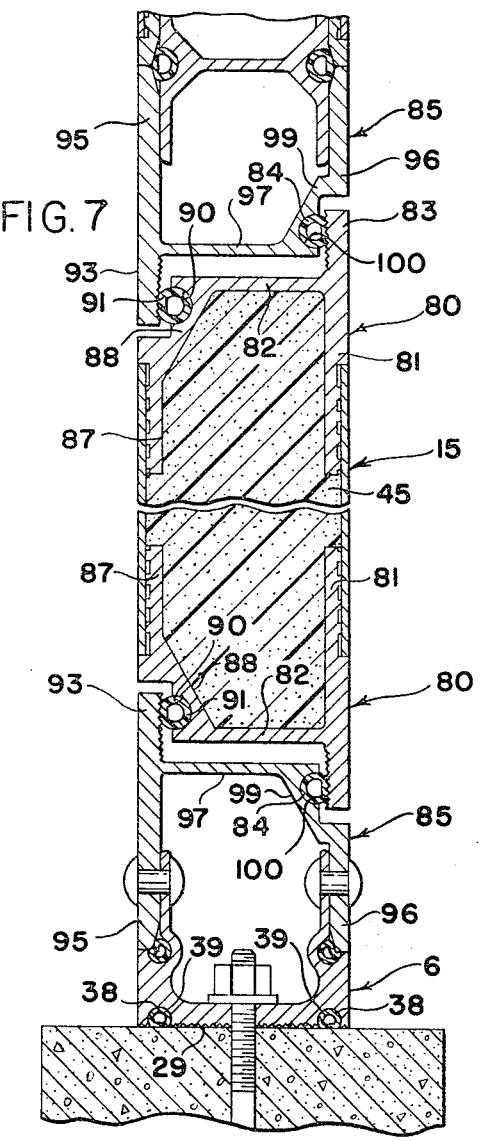
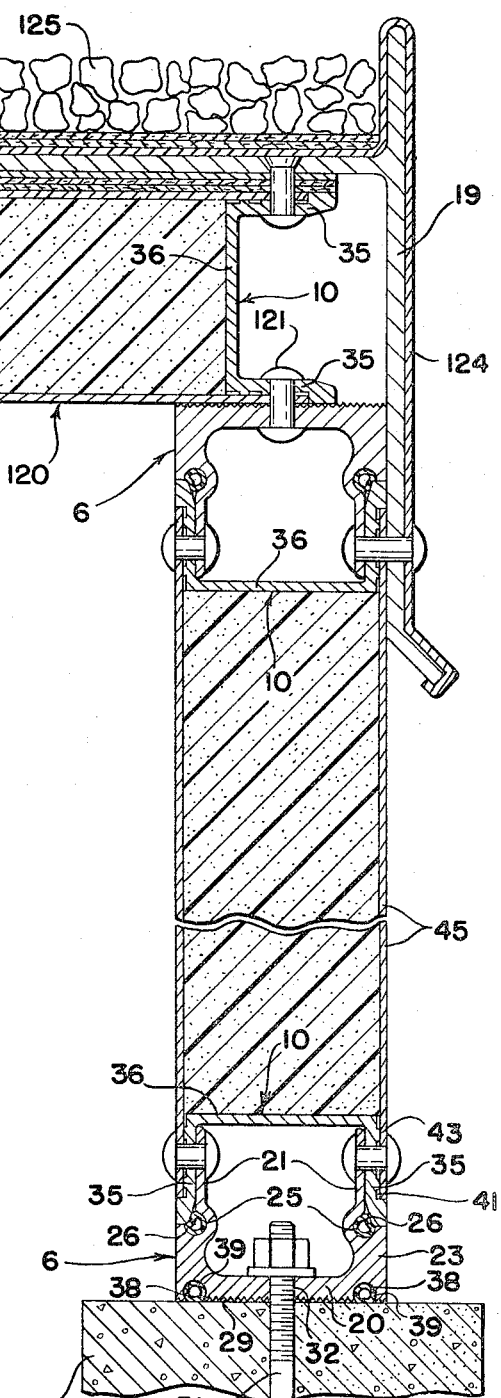
INVENTORS.
FRANKLIN B. BRANDRETH
& JIMMY D. MOLES
BY
ATTORNEY

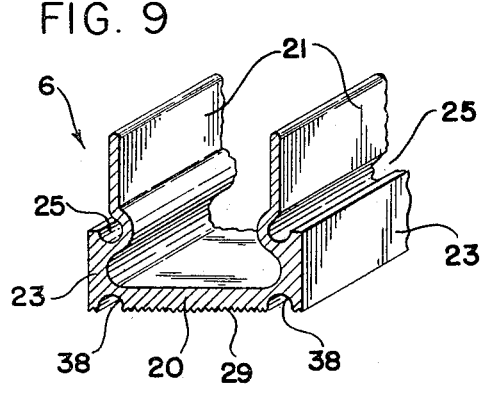
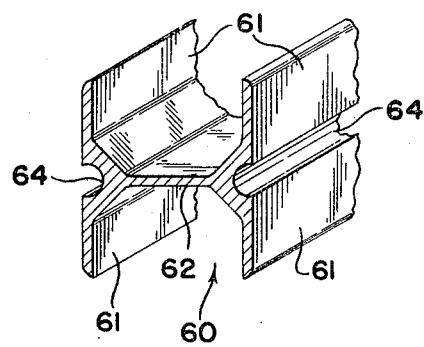
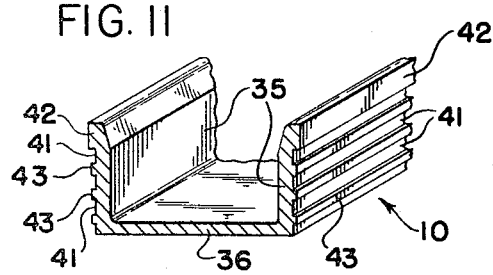
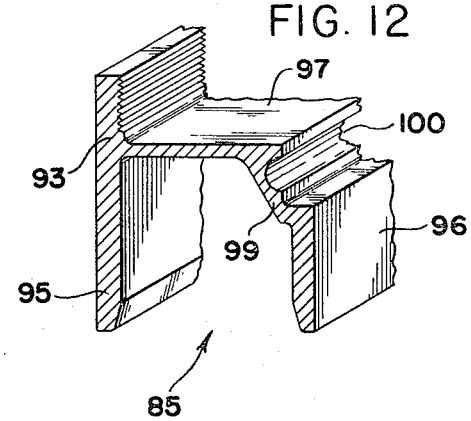
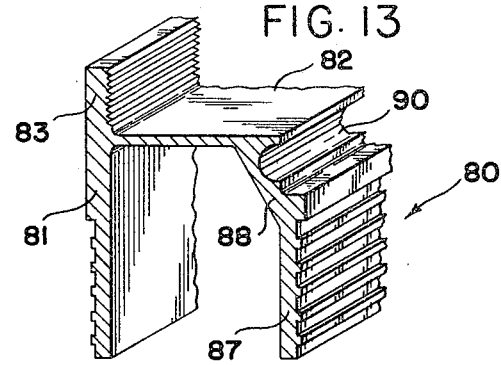
INVENTORS.
FRANKLIN B. BRANDRETH
& JIMMY D. MOLES

United States Patent Office 3,310,926
Patented Mar. 28, 1967

3,310,926
PANEL CONSTRUCTION
Franklin B. Brandreth, Akron, and Jimmy D. Moles, Tallmadge, Ohio, assignors, by mesne assignments, to Air Enterprises, Inc., Barberton, Ohio, a corporation of Ohio
Filed Apr. 8, 1964, Ser. No. 358,295
5 Claims. (Cl. 52—582)

This invention relates to a sandwich-type panel construction used extensively for equipment enclosures and wall sections, particularly central-station air-handling units including fanhouse wall sections and enclosures or housings often located on the roof of a building. The panels may be used in other constructions. The invention includes the finished panels and parts thereof including frame members, mullions (including joining mullions, corner mullions, etc.), sills and combinations thereof, as well as housings formed therefrom.

The frame members, mullions and sills are extruded, usually of aluminum; the face sheets or skins of the panels may be of metal or plastic. The mullions, frame members and sills are fastened together by suitable means such as rivets, bolts, or other mechanical fasteners. The face sheets are adhered to the frame members by adhesive. The interior of each panel is usually filled with a temperature- and noise-insulating material such as polystyrene foam or other plastic foam, or phenolic impregnated paper honeycomb, etc., but any type of filler may be employed. These panels are rigid, although light in weight, and may be made waterproof and air tight. They are easily assembled and may be erected into walls, housings, etc. at the job site or construction area. They are fabricated to meet custom dimensional requirements and specifications.

Normally the panels when erected to form a wall are mounted on a sill member which is designed to rest on a concrete foundation or a roof or other flat surface. The sill member usually extends upward some little distance above any water that may collect in the neighborhood, before being joined to a frame member. Doors, windows, etc. may be included although normally the housing for an air-handling unit will be windowless. It will, however, usually include openings for filters, duct work, louvres, etc.

Each frame member comprises two parallel flanges located side-by-side which extend the entire length thereof. A portion of the outer surface of each flange is grooved, the grooves running the entire length of the flange. Adjacent the grooved portion is a boss which also runs the entire length of the frame member. When a face sheet is positioned against the frame member it covers the grooved portion and abuts the boss. Adhesive is placed between the grooved portion and the face sheet, bringing the outer surface of the face sheet approximately level with the outer surface of the boss. The strength of adhesive such as epoxy adhesives usually depends upon the thickness of the bond. By grooving the surface the adhesive bond is made of greater and less thicknesses and the optimum bond is more closely approximated than could be readily achieved if the surface were not grooved.

The panel frame member is normally three-sided with two flanges and a connecting web which is of uniform thickness. At doors, windows and the like it is often desirable to provide an offset between one of the flanges and the connecting web and thus shorten the bottom surfaces of the web in order to accommodate a flange on a window or door or the like so that the outer surface of this flange is flush with the outer surface of the panel. Gasketing means may be provided in the offset, as will be explained in what follows.

The frame members (including members which frame the door and other closures as well as those which constitute the frames of the individual panels) are advantageously extruded from aluminum or other metal, and are of uniform cross-section throughout. The extrusions provide gasket grooves as required.

Mullions (including joining mullions, corner mullions, etc.) and sill members are designed with flanges which are the length of the flanges of the frame members and fit interchangeably inside of them, usually with a gasket to seal the adjoining portions and make them weather-tight. The gaskets are usually cylindrical tubing, but they may be of other shapes, and may be solid. Normally they are of a vinyl composition, but other flexible gasketing materials may be used.

The invention is further described in connection with the accompanying drawings, in which:

FIGURE 1 is a view in perspective of an enclosure or housing for a central-station air-handling unit;

FIGURE 2 is an exploded view in perspective showing a corner mullion and a sill member with flanges cut back to receive the corner mullion;

FIGURE 3 is an enlarged view showing a flange of a frame member with a face sheet or skin adhesively secured thereto;

FIGURE 4 is an enlarged view of the lower elevation of a corner of the front of the enclosure of FIGURE 1, broken away to fore-shorten it;

FIGURES 5 and 5A are together an enlarged horizontal section on the line 5—5 of FIGURE 1;

FIGURE 6 is an enlarged vertical section on the line 6—6 of FIGURE 1 with the vertical panel broken away to fore-shorten it and showing a roof corner assembly;

FIGURE 7 is an enlarged vertical section through the door on the line 7—7 of FIGURE 1, broken away to fore-shorten it;

FIGURE 8 is an enlarged detail of a modified roof corner;

FIGURE 9 is an enlarged perspective view of a short length of a sill member;

FIGURE 10 is an enlarged perspective view of a short length of a joining mullion used to join two frame members;

FIGURE 11 is an enlarged perspective view of a short length of a panel frame member;

FIGURE 12 is an enlarged perspective view of a short length of a door-opening frame member used to form a door opening or window opening or removable plug panel opening or the like; and FIGURE 13 is an enlarged perspective view of a short length of a frame for a door or window or removable plug panel or the like.

The enclosure or housing of FIGURE 1 is erected on a concrete slab foundation or curb located on a roof, floor or the ground 5, etc. The sill 6 rests on the foundation or curb and is preferably fastened to it by any suitable means. Each of the wall panels is framed by a frame member 10. The door 15 is shown as being installed to swing out, but it may swing in equally well. The louvered inlet 16 is an air inlet, and there is usually an air outlet of similar construction which is not shown. The roof corner shown is formed with gravel stop 19 shown in more detail in FIGURE 6.

Enlarged views of the sill member 6 are shown in FIGURES 2, 6 and 9. This comprises a base portion 20 with parallel flanges 21 perpendicular thereto and each connected to the base member by an offset portion 23 the outer surface of which is flush with a face sheet in the assembled unit. At the juncture between each flange 21 and the offset is a gasket groove 25. The gaskets 26 form a tight seal with the flanges of the adjacent frame member, as will be described. The base of the sill is serrated at 29, but this is optional; the intention is to provide friction to reduce lateral movement of the sill on the foundation or curb 30. The foundation is advantageously provided with studs 31 and the base of the sill member will then be provided with openings 32 to accommodate such studs. The sill members are extruded and such openings will be provided after the extrusion has been completed and may be provided at the site where the enclosure or housing is assembled. Gasket grooves 38 on the bottom surface of the sill member contain gaskets 39 which make sealing contact with the foundation or curb.

The flanges 21 of the sill fit against the flanges 35 of the adjacent frame member 10 which is shown in perspective in FIGURE 11. (See also FIGURES 3, 5, 6, 7 and 8.) These flanges 35 are connected by the web 36. The outer wall of each flange of the framing member 10 is grooved at 41 and adjacent the grooved portion is a boss 42. The wall of the boss is offset outwardly beyond the wall portions 43 which join the grooves 41 so that when a face sheet covers the grooved portion and is adhered thereto by adhesive, the outer surface of the face sheet is essentially flush with the surface of the boss. The enlargement in FIGURE 3 shows the flange 35 and web 36 with grooves 41 adhered to the face sheet 45 by adhesive 46. It also shows a panel core 47 of any suitable composition. It will be noted that the thickness of the adhesive varies between portions of maximum thickness which fill the grooves 41 and the portions of minimum thickness over wall surfaces 43, and the optimum adhesive thickness or bond line is designedly intermediate between these.

FIGURE 5 shows in section a corner mullion 50, also shown in FIGURE 2. This includes a rectangular and preferably square portion 51 with two pairs of parallel flanges 52, 52 and 53, 53 extending from adjacent walls thereof. These flanges are inset from the outer surfaces of the walls of the rectangular portion 51 a sufficient distance so that when combined with frame members 10 the bosses on the flanges of the frame members are flush with the walls of the rectangular portion 51.

At the base of each flange is a gasket groove 55, one groove being common to the adjacent flanges at the inside corner of the mullion. These accommodate gaskets 57 (FIGURE 5) which form seals with the inner ends of the flanges of the adjacent panel frame member 10. The frame members 10 may be fastened to the corner mullion by rivets, bolts or the like passed through the respective flanges. The frame members are interchangeable so that a door-opening frame member may also be assembled over the flanges of a corner mullion.

FIGURES 5, 5A show in section adjoining framing members 10 with their flanges substantially abutting and enclosing a mullion 60 of H cross section, which mullion is also shown in perspective in FIGURE 10. A pair of parallel flanges 61 extend from each end of the cross member 62 of this mullion. In the outer surface of the mullion at opposite ends of the cross member are gasket grooves 64 which contain gaskets 65 which make sealing contact with the inner surfaces of the ends of the flanges of the frame members 10 or 85. The flanges of the mullion are fastened to the flanges of whatever frame member is used by suitable mechanical fastening means.

The door panel (FIGURES 5A and 7) is made from frame members 80 (FIGURE 13) of somewhat different construction from the usual frame member 10. The outer flange 81 extends beyond the web 82 in an extension 83 which seals against gaskets 84 held in the door-opening frame member 85 (FIGURES 5A, 7 and 12) which also is of somewhat different construction from the simple of panel frame member 10. The inner flange 87 does not connect directly with the web 82 but connects through the offset 88. There is a gasket groove 90 in this offset and the gasket 91 forms sealing contact with the flange 93 of the door-opening frame member 85 which is an extension of one of the flanges 95 which connects with the web 97 of this frame member.

The flange 96 is connected to the web through the offset 99. The gasket 84 is located in the gasket groove 100 in this offset. The inner surface of the flange 93 is serrated to improve the seal formed with it by the gasket 91, although such serration is not essential.

The door panel frame member 80 is continuous around the perimeter of the door and the door-opening frame member 85 adjoins and abuts this frame member 80 on all four sides (FIGURES 5A and 7). The hinge 105 is a two-part hinge, one leaf of which is fastened to the flange 81, 83 of the member 80 (FIGURE 5A) and the other leaf is fastened to the flange 96 of the door-opening frame member 85. The handle 110 may be of any usual construction.

FIGURE 6 shows a usual roof construction which includes the roof panel 120, of the same construction as the other panels bordered by panel frame members 10. The frame members are riveted to inverted sill members 6 at 121, and to a gravel stop 19 which covers the outer surface of the wall below the joint with the sill member, and may be of any usual construction. The gravel stop joints are usually covered with a joint cover 124. The roof is built up to a desired thickness and is usually covered with gravel or the like 125.

An alternative roof corner construction is shown in FIGURE 8 in which a corner joint 130 is riveted or otherwise suitably fastened above at 131 through the face sheet to the frame member 10, and below it is similarly fastened at 132 through the face sheet, the frame member 10 and sill member 6. Any suitable corner construction may be used.

In assembling the panels, the abutting ends of the frame members are usually welded together. Then with the core material in place the face sheets are attached by adhesive.

The units may be assembled in a variety of combinations, and because the flange constructions on all mullions and the sill member are spaced to fit snugly into the flanges of all frame members, the different members are interchangeable.

The invention is covered in the claims which follow.

What we claim is:

1. In combination, a frame member with parallel flanges extending therefrom and a mullion with parallel extending flanges located within said flanges of the frame member, mechanical fastening means joining each flange of the frame member with a flange of the mullion and a gasket in sealing relation between each flange of the frame member and a flange of the mullion.

2. The combination of claim 1 in which the flanges of the mullion are connected by a web from each end of which said flanges extend in opposite directions, and the gaskets are located at the ends of the web.

3. The combination of claim 1 which is in a sandwich-type panel and includes a face sheet sealed to the outer face of each frame flange.

4. The structure of claim 1 in combination with a load which is supported by said combination.

5. A structure which comprises a plurality of frame members with two parallel flanges extending from one surface of each, mullions formed by a cross member and two parallel legs extending from each surface of the cross member, with said legs of each mullion within said flanges of a frame member and mechanical fastening means fastening each mullion leg to the adjacent flange of a frame member, the distances between the outer surfaces of all mullions being the same and the distances between the inner flange surfaces of all frame members being the same.

References Cited by the Examiner

UNITED STATES PATENTS

| | | | |
|---|---|---|---|
| 1,360,720 | 11/1920 | Brown et al. | 52—731 |
| 2,790,524 | 4/1957 | Herrschaft | 52—731 X |
| 3,002,235 | 10/1961 | Fountain | 52—731 X |
| 3,054,486 | 9/1962 | DeLaRambelje | 52—731 X |
| 3,128,852 | 4/1964 | Chell et al. | 52—731 |

HARRISON R. MOSELEY, *Primary Examiner.*

P. C. KANNAN, *Assistant Examiner.*

UNITED STATES PATENT OFFICE
CERTIFICATE OF CORRECTION

Patent No. 3,310,926

March 28, 1967

Franklin B. Brandreth et al.

It is hereby certified that error appears in the above numbered patent requiring correction and that the said Letters Patent should read as corrected below.

Column 4, line 10, after "simple" insert -- form --.

Signed and sealed this 7th day of November 1967.

(SEAL)
Attest:

Edward M. Fletcher, Jr.
Attesting Officer

EDWARD J. BRENNER
Commissioner of Patents